United States Patent

[11] 3,610,387

| [72] | Inventor | Hans Vom Stein<br>Wermelskirchen, Rhineland, Germany |
|---|---|---|
| [21] | Appl. No. | 801,089 |
| [22] | Filed | Feb. 20, 1969 |
| [45] | Patented | Oct. 5, 1971 |
| [73] | Assignee | Hans Vom Stein O. H. G.<br>Dhunn-Rhineland, Germany |
| [32] | Priority | May 10, 1968 |
| [33] | | Germany |
| [31] | | P 17 56 340.5 |

[54] ROLLER FOR ROLLER CONVEYORS
7 Claims, 4 Drawing Figs.

[52] U.S. Cl. ............................................. 193/37, 193/35
[51] Int. Cl. ............................................. B65g 13/00
[50] Field of Search ............................................. 193/35, 37

[56] References Cited
UNITED STATES PATENTS

| 1,366,966 | 2/1921 | Spear ........................... | 193/37 |
| 1,919,495 | 7/1933 | Allen ........................... | 193/37 |
| 1,943,998 | 1/1934 | Adams ........................... | 193/37 |
| 2,757,988 | 8/1956 | Lecourbe ..................... | 193/37 UX |

FOREIGN PATENTS

| 278,034 | 9/1966 | Australia ..................... | 193/37 |
| 254,043 | 5/1967 | Austria ........................ | 193/37 |
| 48,647 | 1964 | Poland ......................... | 193/37 |
| 1,208,000 | 9/1959 | France ......................... | 193/37 |

*Primary Examiner*—Harvey C. Hornsby
*Assistant Examiner*—Merle F. Maffei
*Attorney*—Michael S. Striker ABSTRACT: An idler roller for use in roller conveyors comprises a shaft which is nonrotatably installed in the frame of the conveyor, a hollow cylindrical shell coaxial with the shaft, and two annular mounting units each installed in one end of the shell and each provided with an antifriction bearing to facilitate rotation of the shell about the axis of the shaft. Each mounting unit further comprises a labyrinth seal which prevents entry of foreign matter into the respective bearing. The mounting units are assembled of several separably connected parts at least some of which consist of elastic synthetic plastic material.

PATENTED OCT 5 1971  3,610,387

INVENTOR
HANS VOM STEIN
BY
Michael J. Striker
his ATTORNEY

3,610,387

ROLLER FOR ROLLER CONVEYORS

BACKGROUND OF THE INVENTION

The present invention relates to improvements in rollers for use in roller conveyors and analogous apparatus or machines which are employed for transport of crates, packages or other types of discrete commodities. More particularly, the invention relates to improvements in idler rollers for roller conveyors.

SUMMARY OF THE INVENTION

An object of the invention is to provide a roller for roller conveyors which is of lightweight construction, which comprises a relatively small number of simple and inexpensive parts, which can be utilized in existing roller conveyors or like apparatus as a superior substitute for conventional rollers, and which can be installed in or removed from the frames of roller conveyors without resorting to any tools.

Another object of the invention is to provide a roller which can be readily taken apart or reassembled without any tools or by resorting to rudimentary tools, wherein a damaged part can be replaced without necessitating discarding of remaining part or parts, and whose useful life is at least as long as that of presently known rollers.

A further object of the invention is to provide a roller wherein all sensitive parts are protected against damage by contact with dust, dirt, moisture or other foreign matter, which can be converted for use in different types of roller conveyors or analogous transporting apparatus, and which can be assembled of mass-produced parts consisting of readily available inexpensive materials.

The improved roller comprises a hollow shell having a cylindrical external surface which comes in direct contact with transported goods, a shaft coaxial with and extending through the shell, and a pair of mounting units each received in one end of the shell and each comprising an annular end wall secured to and preferably at least partially accommodated in the respective end of the shell, an antifriction bearing surrounding the shaft and accommodated in the respective end wall, and a labyrinth seal at least a portion of which is carried by the end wall and which protects the bearing against entry of foreign matter. At least some parts of each mounting unit or the entire roller (with the possible exception of rolling elements in the bearings) may be produced of synthetic plastic material and at least some parts of each mounting unit are elastic or partly elastic so that they can be assembled by snap action or upon partial deformation to thus facilitate assembly and eventual dismantling of the respective mounting unit.

The roller is preferably further provided with means for yieldably holding the shaft in a given axial position but for permitting the shaft to change its axial position during insertion into or during removal from the frame of a roller conveyor or the like. Certain parts of the labyrinth seals and/or antifriction bearings can be made integral with the respective end walls, and each mounting unit preferably comprises an elastic sleeve which directly surrounds the shaft and is surrounded by the rolling elements of the respective bearing.

The novel features which are considered as characteristic of the invention are set forth in particular in the appended claims. The improved roller itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
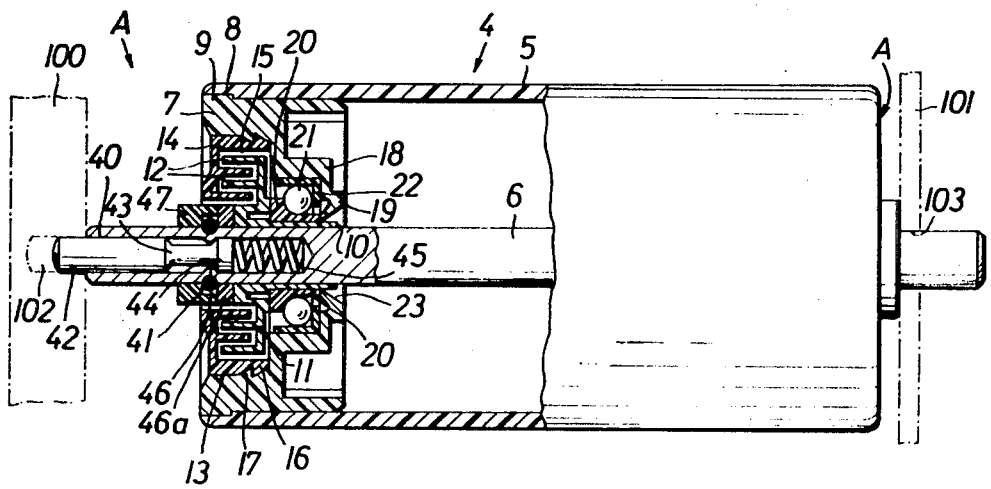
FIG. 1 is a partly elevational and partly axial sectional view of a first roller.

FIG. 1 illustrates a roller 4 which comprises a cylindrical load-supporting and transporting shell 5 rotatable about the axis of a horizontal shaft 6. The roller 4 further comprises two mounting units A only one of which is illustrated in detail. These mounting units serve to center the shell 5 and to permit it to rotate with reference to the shaft 6. The latter is preferably fixedly mounted in the frame structure of the roller conveyor. It can be said that the shaft forms part of such frame structure. Each mounting unit A comprises an annular end wall 7 the outer end of which is provided with a circumferential bead 9 fitted into a complementary annular recess 8 provided in the internal surface at the corresponding end of the shell 5. The remaining portion of the end wall 7 is tightly fitted into the shell 5. The mounting unit A further comprises a plastic sleeve 10 which surrounds the adjoining portion of the shaft 6 and has an integral disk-shaped flange 11 extending radially outwardly toward the internal surface of the shell 5. The flange 11 is provided with two concentric outwardly projecting annular extensions 12 which form part of a labyrinth seal; the latter serves as a means for preventing penetration of dust or other foreign matter into the interior of the roller 4. The outer end face of the end wall 7 has an annular recess 13 which accommodates an annular cap 14. The inner end face of the cap 14 is formed with concentric annular grooves or channels 15 each of which accommodates with clearance one of the extensions 12 on the flange 11 of the sleeve 10. The cap 14 constitutes a second element of the aforementioned labyrinth seal. The circumferential surface of the cap 14 is further provided with outwardly extending claws 16 which are angularly spaced from each other and engage with a single annular claw 17 or with a set of discrete claws 17 provided in the surface surrounding the recess 13 of the end wall 7. The annular outer wall of the cap 14 is at least slightly elastic or deformable so that it can be pushed by hand into the recess 13 whereby the radial flanks of the claws 16 engage the radial flanks of the claw or claws 17 and prevent uncontrolled withdrawal of the cap. Thus, the cap 14 is held in position by snap action and can be withdrawn by exertion of a requisite force whenever desired or necessary. It is clear that the claws 16 can be replaced by a single annular claw and that the claw 17 can be replaced by a set of claws, as long as the claw or claws 16 define a substantially radially extending shoulder or flank which can engage a complementary shoulder or flank on the claw or claws 17 to hold the cap 14 against unintentional withdrawal.

The inner portion of the end wall 7 forms an annular socket 18 for an antifriction bearing including a ring of spherical rolling elements 21. A radially inwardly extending bottom wall 19 of the socket 18 limits axial inward movement of rolling elements 21. The bearing further comprises an outer race 22 which is fitted into the socket 18 and an inner race 20 which surrounds the sleeve 10. The bottom wall 19 is formed with one or more axially outwardly extending elastic tongues 23 which abut against the inner end face of the inner race 20 and serve to seal the chamber for the rolling elements 21 from the interior of the roller 4.

In assembling the mounting unit A, the operator inserts the outer race 22 into the socket 18 of the end wall 7. The rolling elements 21 are inserted in the next step, followed by the inner race 20, sleeve 10 and cap 14 which latter is snapped into the recess 13 in a manner as described above. The end wall 7 is thereupon inserted into the corresponding end of the shell 5 and is fixedly secured thereto in any suitable way. In the next step, the operator passes the shaft 6 through the sleeve 10 and applies an annular cover 47 which surrounds the shaft 6 in the region of the cap 14. A split ring 46 is applied prior to attachment of the cover 47 to hold the shaft 6 against axial movement in one direction. This split ring 46 (or an analogous fastener) is installed between the end wall of the cap 47 and a washer 46a which abuts against the outer end face of the sleeve 10.

FIG. 1 further shows an optional feature of the roller 4 which includes the provision of a blind bore 40 in the end of the shaft 6 for an axially reciprocable plunger 42. The latter is formed with a circumferential groove 43 which can receive a radially inwardly extending ring-shaped rib 41 of the adjoining hollow cylindrical portion of the shaft 6. The axial length of the rib 41 is a small fraction of the axial length of the groove 43 so that the plunger 42 has some freedom of axial movement with reference to the shaft 6. A helical expansion spring 45 is inserted in the innermost portion of the blind bore 40 to bias the head 44 of the plunger 42 axially away from the center of the roller 4. The plunger 42 facilitates insertion of the roller 4 into the frame structure of a roller conveyor in the following way: The plunger 42 is depressed by hand to stress the spring 45 so that the overall axial length of the roller 4 is reduced accordingly. The frame structure includes two sidewalls 101, 100 (indicated by phantom lines) having holes 103, 102 for the right-hand end of the shaft 6 and for the outer end portion of the plunger 42. When the plunger is depressed, the right-hand end portion of the shaft 6 can be introduced into the hole 103 and the plunger is then moved into registry with the hole 102. By releasing the plunger 42, the operator permits the spring 45 to expand and to propel the outer end portion of the plunger into the hole 102. This completes installation of the roller 4 in the frame structure.

The connections between the parts of the mounting units A and the shell 5 and/or shaft 6 are preferably free of threads so that the roller 4 can be assembled without resorting to thread cutting machines or the like. It will be seen that each mounting unit A comprises only four main parts, namely, the end wall 7, the sleeve 10, the antifriction bearing 20–22, and the cap 14. Each of these parts is readily separable from the other part or parts so that, when the sleeve 10 or another part requires replacement, the remaining parts need not be discarded but can form a satisfactory mounting unit with a fresh sleeve or other part which was replaced. Sleeves 10 with different internal diameters can be kept in stock so that the roller 4 can employ shafts of different diameters. In the roller 4 of FIG. 1, each cap 14 serves as a means for separably holding the four main parts of the respective mounting unit A in requisite position with reference to each other during insertion into the respective end of the shell 5 as well as when the roller is in use.

Figure 2:
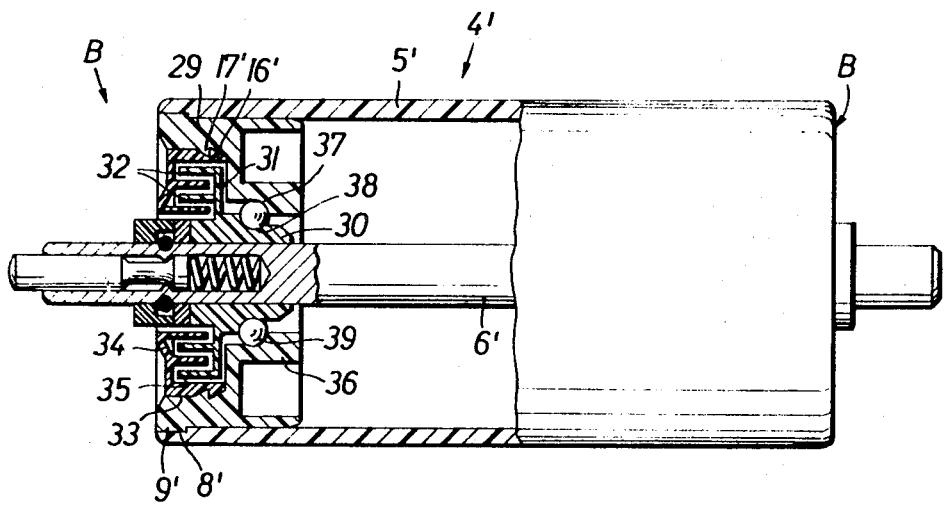
FIG. 2 is a similar view of a second roller.

FIG. 2 illustrates a simpler second roller 4'. This roller also comprises a shaft indicated at 6', a cylindrical shell 5' and two modified mounting units B. Each mounting unit B includes a plastic sleeve 30 having a disk-shaped flange 31 provided with annular extensions 32 corresponding to extensions 12 of flange 11 on the sleeve 10. The end wall 29 has a recess 33 for the annular wall of a cap 34 which is provided with one or more claws 16' engaging one or more complementary claws 17' of the end wall 29. The extensions 32 of the flange 31 are received with clearance in annular grooves or channels 35 of the cap 34 so that this cap and the extensions 32 form a labyrinth seal in the same way as described in connection with FIG. 1. The end wall 29 has an annular socket 36 which constitutes the outer race of an antifriction bearing further including spherical rolling elements 39 located between the outer race 36 and an inner race forming part of the sleeve 30. The sleeve has a concave annular track 38 for portions of rolling elements 39; a second concave annular track 37 is provided in the internal surface of the outer race 36. The configuration of tracks 37, 38 is such that the rolling elements 39 hold the sleeve 30 against axial movement with reference to the end wall 29 and vice versa.

During assembly of a mounting unit B, the rolling elements 39 are held in the track 37 of the outer race 36 by a suitable tool (not shown) while the sleeve 30 is pushed into the interior of the end wall 29 until the rolling elements enter the track 38. Such penetration of rolling elements 39 into the track 38 is possible because the sleeve 30 is elastic. In the next step, the operator inserts the elastic cap 34 into the recess 33 of the end wall 29 so that the radial shoulder or shoulders of the claw means 16' engage the complementary shoulder or shoulders of the claw means 17' and that the bead 9' of the end wall 29 enters the matching recess 8' of the shell 5'.

In the roller 4' of FIG. 2, the rolling elements 39 serve as a means for separably coupling the sleeve 30 of the respective mounting unit B with the respective end wall 29, i.e., the caps 34 are used exclusively to form labyrinth seals with the respective sleeves 30.

Figure 3:
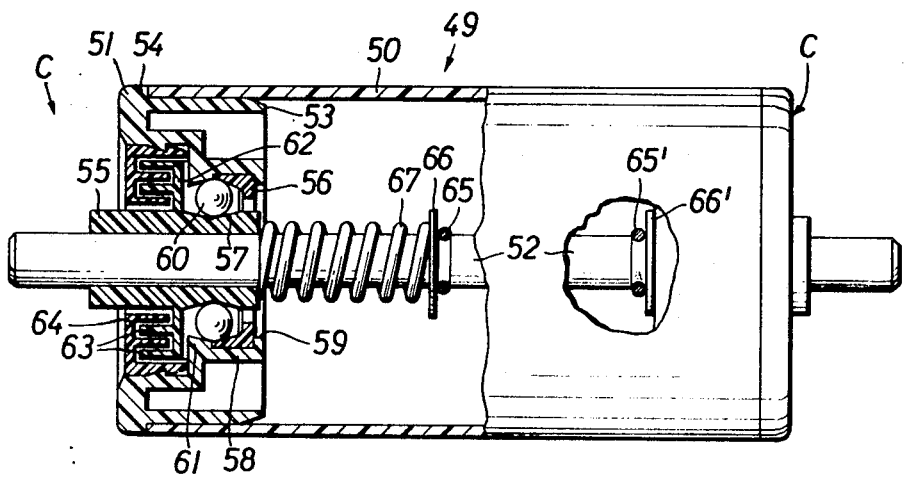
FIG. 3 is a similar view of a third roller.

FIG. 3 illustrates a third roller 49 having a cylindrical shell 50, a shaft 52 and two mounting units C (only one shown in detail). Each mounting unit C comprises an end wall 51 provided with an outer cylindrical portion 53 fitted into the corresponding end of the shell 50 and an annular bead 54 which abuts against the adjoining end face of the shell and whose external diameter preferably equals the external diameter of the shell. Each mounting unit C further comprises a plastic sleeve 55 which surrounds the adjoining portion of the shaft 52 and is provided with an annular track 57 for the rolling elements 60 of an antifriction bearing. Thus, a portion of the sleeve 55 constitutes the inner race of such bearing. The sleeve 55 has a disk-shaped flange 62 with annular extensions 63 forming part of a labyrinth seal and extending with clearance into grooves provided in an annular cap 64. The manner in which the cap 64 is held in the recess of the end wall 51 by snap action is the same as described in connection with FIGS. 1 and 2.

The end wall 51 has an inner cylindrical portion 58 of reduced diameter which is inwardly adjacent to the flange 62 and surrounds a chamber for the antifriction bearing including the rolling elements 60. The outer axial end of the cylindrical portion 58 has a radially inwardly extending annular rim 61 which defines a portion of the outer track for rolling elements 60. The cylindrical portion 58 accommodates an outer race 56 which defines the remainder of the outer track for the rolling elements 60. The bottom wall 59 of the cylindrical portion 58 limits the axial inward movement of the outer race 56. The bottom wall 59 preferably constitutes an inwardly deformed integral part of the cylindrical portion 58; such deformation can be readily effected after requisite heating if the portion 58 consists of synthetic thermoplastic material.

In assembling a mounting unit C, the operator inserts the sleeve 55 into the end wall 51 and inserts the rolling elements 60 from the right-hand side, as viewed in FIG. 3. The outer race 62 is inserted in the next-following step, and the inner cylindrical portion 58 is then deformed to provide the bottom wall 59. This also establishes a connection between the sleeve 55 and end wall 51 by way of the rolling elements 60. The cap 64 is then inserted into the recess in the outer end face of the end wall 51 and the mounting unit C is ready for installation in the corresponding end of the shell 49. The shaft 52 is introduced in the final step.

FIG. 3 further shows an optional feature of the roller 49. The shaft 52 is surrounded by two axially spaced radially extending projections here shown as annular collars 66, 66' which are held against axial movement toward each other by split rings 65, 65'. When both ends of the shaft 52 extend beyond the shell 50 to the same extent, the right-hand collar 66' abuts against the right-hand mounting unit C. A helical expansion spring 67 surrounds the shaft 52 in the region between the collar 66 and the left-hand mounting unit C. Thus, the operator can shift the shaft 52 axially to the left, as viewed in FIG. 3, by overcoming the bias of the spring 67 to thus facilitate insertion of the roller 49 into a frame forming part of the roller conveyor. The spring 67 is preferably designed in such a way that it permits complete depression of the right-hand end of the shaft 52 into the right-hand mounting unit C to thus facilitate insertion of the left-hand end of the shaft into a suitable hole of the left-hand sidewall (corresponding to the sidewall 100 of FIG. 1). The roller 49 is then moved to requisite position and the right-hand end of the shaft 52 is released so that the spring 67 expands and propels the right-hand end of the shaft into a complementary hole corresponding to hole 103 in the sidewall 101 of FIG. 1. The collar 66' and split ring 65' can be omitted if the split ring 65 is installed immediately adjacent to the right-hand mounting unit C.

Figure 4:
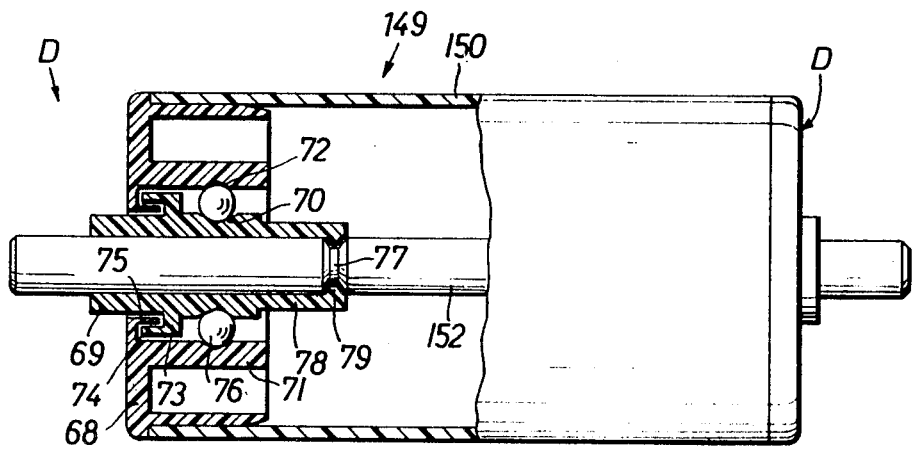
FIG. 4 is a similar view of a fourth roller.

Referring finally to FIG. 4, there is shown a roller 149 having a cylindrical shell 150 of constant wall thickness, a shaft 152, and two mounting units D. Each mounting unit D comprises a plastic sleeve 69 with a radially extending annular flange 73 for an annular extension 74 which is received in the annular groove 75 of an end wall 68. Thus, in this embodiment of my invention, each labyrinth seal comprises a single extension 74 and a single groove 75 and the outer part of this seal is integral with the respective end wall 68. In other words, the cap and the end wall form a single one-piece element of the mounting unit D. Two tracks 70, 72 for rolling elements 76 of an antifriction bearing are respectively provided in the sleeve 69 and a cylindrical intermediate portion 71 of the end wall 68. When the rolling elements 76 are properly received in their tracks 70, 72 they couple the end wall 68 to the sleeve 69.

In assembling a mounting unit D, the operator inserts the rolling elements 76 into the track 70 of the sleeve 69 and holds the thus inserted rolling elements by means of a suitable tool, not shown. The end wall 68 is then applied around the sleeve 69 so that the outer portions of rolling elements 76 snap into the outer race 72 in the cylindrical intermediate portion 71. The mounting unit D is then ready for insertion into and attachment to the corresponding end of the shell 150.

FIG. 4 shows that the shaft 152 is provided with a circumferential groove 77 and that the sleeve 69 is formed with an inwardly extending axially parallel elastic arm 78 having at its innermost end a protuberance 79 which can snap into the groove 77. The protuberance 79 can be expelled from the groove 77 in response to exertion of a certain pressure against the left-hand or against the right-hand end of the shaft 152 so that the latter is movable axially of the mounting units D. This enables the operator to readily install the roller 149 between the sidewalls of a frame structure substantially in the same way as described in connection with the shaft 52 of FIG. 3. The shaft 152 is thereupon moved lengthwise until the protuberance 79 reenters the groove 77.

It is clear that the improved roller is susceptible of many additional modifications without departing from the spirit of the present invention. For example, certain features of the roller 4 and/or 4′ can be incorporated in the roller 49 and/or 149, or vice versa. To mention a single instance of such interchangeability of features, the collars 66, 66′, split rings 65, 65′ and spring 67 shown in FIG. 3 can be used as a substitute for the parts 40–45 of FIG. 1, or vice versa.

An important feature which is common to all illustrated embodiments of my roller resides in that the roller can be assembled of a small number of simple mass-produced parts and that a defective part can be replaced without necessitating discarding of remaining parts of the roller. Also, at least the majority of component parts can be produced of readily available synthetic plastic materials. The roller can be repeatedly installed in or withdrawn from the frame structure of a roller conveyor and it may be used with similar rollers or with conventional rollers. The labyrinth seals insure that the interior of the roller is protected against penetration of dust, dirt, moisture or other foreign matter. Still further, the improved roller can utilize conventional shafts of different diameters.

For example, to replace the shaft 6′ of FIG. 2 with a shaft of smaller diameter, it is merely necessary to replace the sleeves 30 of the two mounting units B with sleeves having smaller-diameter axial holes or bores. A supply of sleeves 10, 30, 55 and/or 69 with axial holes or bores of different diameters can be kept in stock to enable the operator to mount the shells and the mounting units of the corresponding rollers on shafts of different diameters.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. A roller for use in roller conveyors or the like comprising a hollow shell having a substantially cylindrical external surface; a pair of mounting units each received in one end of said shell and each comprising annular end wall means secured to the respective end of said shell, ball bearings accommodated in the respective end wall means, and labyrinth seal means at least a portion of which is carried by said end wall means, each of said ball bearings comprises an outer race mounted in said end wall means, an inner race, balls between said races, one of said races having resilient tongues engaging the other race; snap action elements on each of said means for securing such means to each other by snap action so that each mounting unit is insertable as a complete unit into said shell; and a shaft coaxial with and extending through said shell and the ball bearing of each unit.

2. A roller as defined in claim 1, wherein said portion of each labyrinth seal comprises an annular cap which is removably received in the respective end wall means.

3. A roller as defined in claim 2, wherein each of said end wall means has an outer end face provided with an annular recess for the respective cap, and wherein said snap action elements comprise complementary claws provided on said caps and said end wall means and engaging each other to releasably hold the caps in the respective recesses.

4. A roller as defined in claim 1, wherein each of said ball bearings comprises a sleeve directly surrounding said shaft, and wherein a second portion of said labyrinth seal means is integral with said sleeve.

5. A roller as defined in claim 1, wherein said shell has an internal surface provided with an annular recess at each end thereof and wherein each of said end walls comprises a circumferential bead received in the respective recess.

6. A roller as defined in claim 1, wherein at least one axial end of said shaft is provided with a blind bore and further comprising a plunger reciprocably received in said bore, means for limiting the axial movement of said plunger, and means for biasing said plunger outwardly.

7. A roller as defined in claim 3, wherein at least a portion of each of said caps consists of elastomeric material.